(12) United States Patent
Schimpe (10) Patent No.: US 6,282,345 B1
(45) Date of Patent: Aug. 28, 2001

(54) DEVICE FOR COUPLING WAVEGUIDES TO ONE ANOTHER

(75) Inventor: Robert Schimpe, Ottobrunn (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/254,741

(22) PCT Filed: Sep. 11, 1997

(86) PCT No.: PCT/DE97/02031

§ 371 Date: Nov. 1, 1999

§ 102(e) Date: Nov. 1, 1999

(87) PCT Pub. No.: WO98/11461

PCT Pub. Date: Mar. 19, 1998

(30) Foreign Application Priority Data

Sep. 13, 1996 (DE) .............................................. 196 37 396

(51) Int. Cl.[7] ...................................................... G02B 6/26

(52) U.S. Cl. ................................ 385/50; 385/42; 385/43

(58) Field of Search ................................. 385/15, 39, 42, 385/43, 50

(56) References Cited

U.S. PATENT DOCUMENTS

| 4,400,053 | * | 8/1983 | Kazkaz | 385/39 |
| 4,896,932 | * | 1/1990 | Cassidy | 385/50 |
| 5,078,516 |   | 1/1992 | Kapon et al. | 385/129 |
| 5,323,476 | * | 6/1994 | Mueller et al. | 385/43 |
| 5,568,579 | * | 10/1996 | Okaniwa | 385/43 |

FOREIGN PATENT DOCUMENTS

| 0 498 170 | 8/1992 | (EP) . |
| 0 539 298 | 4/1993 | (EP) . |
| 0 561 672 | 9/1993 | (EP) . |

OTHER PUBLICATIONS

Janz et al, "Improved Fibre Coupling to GaAss/AIGaAs Rib Waveguides, Using a Regrowth–Free Mode 'Drive–Down' Technique", *Electronics Letters*, vol. 32, No. 11, May 23, 1996, pp. 1002–1003.

Hyoun Soo Kim et al, "Tapered, Both in Dimension and in Index, Velocity Coupler: Theory and Experiment", *IEEE Journal of Quantum Electronics*, vol. 29, No. 4, Apr. 1993, pp. 1158–1167.

Abstract of Japanese 4–15604 Published Jan. 21, 1992, *Patent Abstracts of Japan*.

Naganuma et al, "Semiconductor Guided–Wave Spatial Photonic Switches", *NTT Review*, vol. 7, No. 5, Sep. 1995, pp. 30–34.

Frigo et al, "A Wavelength–Division Multiplexed Passive Optical Network with Cost–Shared Components", *IEEE Photonics Technology Letters*, vol. 6, No. 11, Nov. 1994, pp. 1365–1367.

Koren et al, "Polarisation Insensitive Semiconductor Optical Amplifier with Integrated Electroabsorption Modulators", *Electronics Letters*, vol. 32, No. 2, Jan. 18, 1996, pp. 111–112.

Aoki et al, "Monolithic Integration of DFB Lasers and Electroabsorption Modulators Using In–Plane Quantum Energy Control of MQW Structures", *International Journal of High Speed Electronics and Systems*, vol. 5, No. 1, (1994), pp. 67–90.

(List continued on next page.)

*Primary Examiner*—John D. Lee
(74) *Attorney, Agent, or Firm*—Schiff Hardin & Waite (57) ABSTRACT

In the inventive arrangement, the core layers of two optical waveguides are arranged parallel to one another at a distance and overlap in an overlap region. In the overlap region, at least one of the waveguides comprises a cross-sectional taper. The effect thereof is that a wave guided in one waveguide couples completely over into the other in the overlap region.

17 Claims, 8 Drawing Sheets

OTHER PUBLICATIONS

D. Wake, "A 1550–nm Millimeter–Wave Photodetector with a Bandwidth–Efficiency Product of 2.4 THz", *Journal of Lightwave Technology*, vol. 10, No. 7, Jul. 1992, pp. 908–912.

Ramdane et al, Very Simple Approach for High Performance DFB Laser–Electroabsorption Modulator Monolithic Integration, *Electronics Letters*, vol. 30, No. 23, Nov. 10, 1994, pp. 1980–1981.

Ramdane et al, "Monolithic Integration of InGaAsP–InP Strained–Layer Distributed Feedback Laser and External Modulator by Selective Quantum–Well Interdiffusion", *IEEE Photonics Technology Letters*, vol. 7, No. 9, Sep. 1995, pp. 1016–1018.

G. Müller et al, "Tapered InP/InGaAsP Waveguide Structure for Efficient Fibre–Chip Coupling", *Electronics Letters*, vol. 27, No. 20, Sep. 26, 1991, pp. 1836–1838.

Wenger et al, "Highly Efficient Multi–Fiber–Chip Coupling with Large Alignment Tolerances by Integrated InGaAsP/InP Spot–Size Transformers", *ECOC '92*, Berlin, pp. 927–930, (1992).

Thurston et al, "Two–Dimensional Control of Mode Size in Optical Channel Waveguides by Lateral Channel Tapering", *Optics Letters*, vol. 16, No. 5, Mar. 1, 1991, pp. 306–308.

Bauer et al, "High Responsivity Integrated Tapered Waveguide PIN Photodiode", Proc. $19^{th}$ European Conference on Optical Communication (ECOC '93), vol. 2, Montreux, Sep. 12–16, 1993, paper Tu 28 (pp. 277–280).

Smith et al, "Reduced Coupling Loss Using a Tapered–Rib Adiabatic–Following Fiber Coupler", *IEEE Photonics Technology Letters*, vol. 8, No. 8, Aug. 1996, pp. 1052–1054.

Braun et al, "Optical Millimeter–Wave Generation and Data Transmission for Mobile 60–70 GHz–Band Communications", $22^{nd}$ European Conference on Optical Communication (ECOC '96), Oslo, Paper ThC 1.3, pp. 4.63–4.65, (1996).

\* cited by examiner

DEVICE FOR COUPLING WAVEGUIDES TO ONE ANOTHER

BACKGROUND OF THE INVENTION

The invention is directed to an arrangement for coupling at least two waveguides to one another with each waveguide having at least one core layer for guiding an optical wave having a specific wavelength $\lambda$.

Arrangements for coupling optical waveguides to one another have numerous applications in the realization of components and for offering connections between optical components in integrated optics.

Most arrangements for coupling optical waveguides to one another use butt coupling (see, N. J. Frigo et al "A Wavelength-Division Multiplexed Passive Optical Network with Cost-Shared Components", *IEEE Photonics Technology Letters*, Vol. 6, No. 11, November 1994, pp. 1365–1367). The end of a waveguide having a specific lateral or transverse structure thereby strikes against another waveguide having a different lateral or transverse structure. The most obvious manufacturing method uses etching for removing the core of a waveguide and epitaxial growth of the second waveguide with MOVPE or MOMBE. The advantage of this method is the independent selection of the material compositions and dimensions of the two waveguides. However, the difficulty of epitaxial crystal growth at the abutting location exists that this requires the utilization of the edge zones of the epitaxially grown material.

When only a slight difference in the material composition of the two waveguides is required such as, for example, for the integration of a laser and modulator, then mask-dependent, selective epitaxy is available as a relatively simple manufacturing method. Compromises must thereby be accepted in the laser function or modulator function (see M. Aoki et al "Monolithic Integration of DFB Lasers and Electroabsorption Modulators Using In-Plane Quantum Energy Control of MQW Structures", *International Journal of High Speed Electronics and Systems*, Vol. 5, No. 1 (1994), pp. 67–90), such as:

1. Mask-dependent, selective epitaxy allows only slight variation of the wavelength of the photo luminescence (PL) between 1.57 and 1.46 $\mu$m and is coupled with a variation of the layer thickness.
2. Due to the waveguide section in the region of the band edge transition having a length of approximately 50 through 70 $\mu$m corresponding to the gas diffusion length in the MOVPE, additional absorption losses arise (0.5 B at 50 $\mu$m length and 1.55 $\mu$m wavelength).
3. When the modulating electrical field extends in this region with variable PL wavelength and layer thickness, the light that passes through can be spectrally broadened (chirp).

It is simplest to employ the same layer packet for the various optical components (see D. Wake, "A 1550-nm Millimeter-Wave Photodetector with a Bandwidth-Efficiency Produce of 2.4 THz", *Journal of Lightwave Technology*, Vol. 10, No. 7, July 1992, pp. 908–912; A. Ramdane et al, "Very Simple Approach for High Performance DFT Laser-Electroabsorption Modulator Monolithic Integration", *Electronics Letters*, Vol. 30, No. 23, Nov. 10, 1994, pp. 1980–1981; and A. Ramdane et al "Monolithic Integration of InGaAsP—InP Strained-Layer Distributed Feedback Laser and External Modulator by Selective Quantum-Well Interdiffusion", *IEEE Photonics Technology Letters*, Vol. 7, No. 9, September 1995, pp. 1016–1018). In this method, the losses in the component properties are especially high since an optimization can only ensue to a limited extent, for example by employing mechanically stressed quantum wells and barriers or by partial re-ordering (disordering) of quantum wells.

Vertically structured waveguide ends (see G. Müller et al, "Tapered InP/InGaAsP Waveguide Structure for Efficient Fibre-Chip Coupling", *Electronics Letters*, Vol. 27, No. 20, Sep. 26, 1991, pp. 1836–1837; and G. Wegner et al, "Highly Efficient Multi-Fiber-Chip Coupling with Large Alignment Tolerances by Integrated InGaAsP/InP Spot-Size Transformers", *ECOC '92*. Berlin, pp. 927–930) or laterally structured waveguide ends (see R. N. Thurston et al, "Two-Dimensional Control of Mode Size in Optical Channel Waveguides by Lateral Channel Tapering", *Optics Letters*, Vol. 16, No. 5, Mar. 1, 1991, pp. 306–308; J. G. Bauer et al, "High Responsivity Integrated Tapered Waveguide PIN Photodiode", *Proc. $19^{th}$ Europ. Conf. Opt. Commun.* (*ECOC '93*), Vol. 2, Montreux, Sep. 12–16, 1993, paper Tu 28 (p. 277–280); and R. E. Smith et al, "Reduced Coupling Loss Using a Tapered-Rib Adiabatic-Following Fiber Coupler", *IEEE Photonics Technology Letters*, Vol. 8, No. 8, August 1996, pp. 1052–1054) are employed for waveguide couplers in other works. The core or a cladding layer of the waveguide is thereby tapered such that the optical field is transferred into other regions of this waveguide.

Arrangements for coupling optical waveguides to one another have numerous applications in the realization of components and for offering connections between optical components in integrated optics.

SUMMARY OF THE INVENTION

The invention which comprises core layers of both waveguides being arranged essentially parallel to one another at a vertical distance from one another relative to the layers that is at least equal to half the wavelength of a wave guided in a core layer and overlap one another in an overlap region and are separated from one another in the overlap region by a cladding layer having a refractive index that is lower relative to the core layers, so that an optical wave guided in the core layer of a waveguide can be coupled over through the cladding layer into the core layer of the other waveguide in the overlap region, and at least one of the two waveguides is a ridge waveguide with a ridge being fashioned on at least one flat side of the core layer of this waveguide, with a longitudinal axis determining the direction of an axis of the propagation of an optical wave guided in this core layer proceeds parallel to this core layer and the ridge waveguide and/or other waveguide comprises a cross-sectional taper in the overlap region in a specific direction of the longitudinal axis of the ridge, on the object of offering an arrangement for coupling optical waveguides to one another that is compatible with planar waveguides, particularly ridge waveguides.

The inventive arrangement connects waveguides that lie vertically above one another. The waveguides respectively have at least one core layer. At least one of the waveguides is fashioned as a ridge waveguide. The waveguides are spatially separated by a cladding layer having a lower retractive index then the core layers. The cladding layer effects an optical coupling of the two waveguides, so that the power of the optical fundamental mode of the coupling structure is guided in both waveguides. When at least a part of the core layer or of a cladding layer of a waveguide is removed or added, then the optical power is displaced into one of the two waveguides. Given an adequately weak modification of the structure of the coupling arrangement along the axis of the wave propagation, the spatial shift of the optical power ensues adiabatically in the coupler, i.e. without losses due to optical emission.

The inventive arrangement advantageously produces a transition from phase mismatching to phase matching between the two waveguides. The transition from phase mismatch to phase match between the two waveguides is effected by the cross-sectional taper within the overlap region of the two waveguides. Given phase matching, in particular, the phase velocities of the optical waves respectively guided in the two waveguides are of the same size.

The inventive arrangement can be utilized on all substrates, for example substrates of $SiO_2$, $Si_3N_4$, $Al_2O_3$, SiGe with suitability for optical components. Let a few current applications for such arrangements be cited with reference to the example of semiconductor components having laser-active material such as, for example, GaN, GaAs, InP or more complex mixed crystals:

High-power laser diode with window structure for avoiding "hot spots" at the light exit face.

DBR lasers without butt coupling between amplifier and mirror area for suppressing unwanted reflexes at the transition.

Laser diode or amplifier with taper for cost-beneficial coupling to an optical fiber waveguide or planar light wave circuit (PLC) of, for example, a bidirectional module.

DFB laser diode with external modulator for, for example, wavelength-division multiplex or long-distance system.

Modulator with optical amplifier for, for example, cost-beneficial access to fiber-to-the loop (FTTL) system, for example with the architecture of the RITE network (see the above-mentioned article by N. J. Frigo et al and an article by U. Koren et al, "Polarisation Insensitive Semiconductor Optical Amplifier with Integrated Electroabsorption Modulators", *Electronics Letters*, Vol. 32 (1996), pp. 111–112) of Lucent Technologies.

In order to turn such optical components into a product, arrangements are required whose manufacturing method is largely compatible with processes that have already been introduced. The inventive arrangement advantageously performs this. It can, moreover, be advantageously directly combined with a ridge waveguide that is employable in laser diode production.

Preferred and advantageous exemplary embodiments of the inventive arrangement includes the ridge waveguide having a cross-sectional taper in the specific direction and ending at the overlap region. Both waveguides can be ridge waveguides. One of the waveguides can be a semiconductor laser, an optical modulator, a mode transformer, a Bragg grating, a curved course, an optical filter, and/or an optical power splitter.

The invention also advantageously creates an arrangement for coupling at least two optical components to one another, each thereof comprises a respective core layer belonging to an optical waveguide for guiding an optical wave having a specific wavelength. This arrangement is especially advantageous for the optical connection of optical components with ridge waveguide structure. It is particularly certain laser diodes that exhibit such a structure.

Preferred and advantageous developments of the arrangement includes one of the waveguides forming a waveguide fork having at least two waveguide branches which overlap core layers of components in overlap regions. The component can be a semiconductor laser, an optical detector, an optical modulator and an optical amplifier.

In an arrangement according to the invention, a minimum thickness of the cladding layer in an overlap region is not of critical significance. A phase matching in an overlap region is also not of critical significance, so that the core layers overlapping one another can be the core layers of monomode waveguides.

An arrangement according to the invention highly simplifies the integration of the components. Since the optical field can be more greatly expanded in the waveguide for containing the further core layer, the coupling of the arrangement to optical fiber waveguides is advantageously facilitated.

BRIEF DESCRIPTION OF THE DRAWINGS

Exemplary embodiments of the invention are explained in greater detail by way of example in the following specification with reference to the Figures.

DESCRIPTION OF THE PREFERRED EMBODIMENTS

In all exemplary embodiments shown in the Figures, the inventive arrangement (referenced in general with 1) for coupling at least two waveguides to one another, potentially together with other devices such as laser diodes, modulators, photo diodes, etc. is integrated on the surface 20 of a substrate 2.

The two waveguides of the arrangement 1 are referenced 3 and 4 and respectively comprise a core layer for guiding an optical wave, whereby the core layer of the waveguide 3 is referenced 30 and the core layer of the waveguide 4 is referenced 40.

The core layers 30 and 40 are arranged parallel to the surface 20 of the substrate 2, whereby the core layer 30 of the waveguide 3 is arranged at a greater vertical distance from the surface 20 then the core layer 40 of the waveguide 4. As a result thereof, the core layers 30 and 40 are arranged at a distance d34 from one another vertical relative to these layers 30 and 40.

The distance d34 between the two core layers 30 and 40 is to be selected of such a size that an optical wave guided in one of the waveguides 3 or 4 does not extend essentially into the other waveguide 4 or, respectively, 3 upon entrance into the below-cited overlap region 6. The distance d34 should be at least equal to half the wavelength $\lambda$ of an optical waveguide in a core layer 30 and/or 40.

The two core layers 30 and 40 overlap one another in an overlap region 6 and are separated from one another in the overlap region 6 by a cladding layer 7 having a refractive index that is lower relative to the core layers 30 and 40 and through which the optical wave guided in the core layer of one waveguide, for example the core layer 30 of the waveguide 3, can be coupled over into the core layer 40 of the other waveguide 4.

At least one of the two waveguides 3 and/or 4 is a ridge waveguide, whereby a ridge 8 is fashioned on at least one flat side of its core layer 30 and/or 40, this ridge 8 proceeding along a longitudinal axis 80 that is parallel to this core layer 30 and/or 40 and, thus, to the surface 20 of the substrate 2.

The longitudinal axis 80 defines the direction of an axis 31 and/or 41 of the propagation of an optical wave guided in the core layer 30 and/or 40 of the ridge waveguide 3 and/or 4.

In the overlap region 6, the ridge waveguide 3 or 4 and/or the other waveguide 4 or, respectively, 3, which can also be a ridge waveguide, exhibits a cross-sectional taper 9 in a specific direction r of the longitudinal axis 80 and, thus, of the axis 80 of the wave propagation, this cross-sectional taper 9 advantageously effecting that a transition from phase mismatch to phase match between the two waveguides 3 and 4 occurs within the overlap region 6. Given phase mismatch, in particular, the phase velocities of the waves respectively running in the two waveguides 3 and 4 are of the same size, as a result whereof the coupling of optical power between the waveguides 3 and 4 is advantageously especially efficient.

The exemplary embodiments shown in the Figures shall now be described in greater detail.

Figure 1:
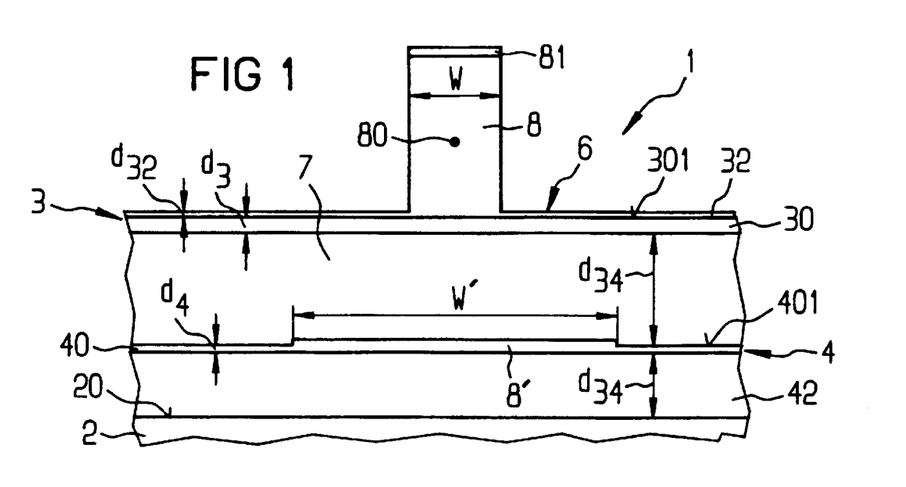
FIG. 1 is a cross-section through the overlap region of a first exemplary embodiment of the inventive arrangement perpendicular to the axis of the wave propagations.
Figure 2:
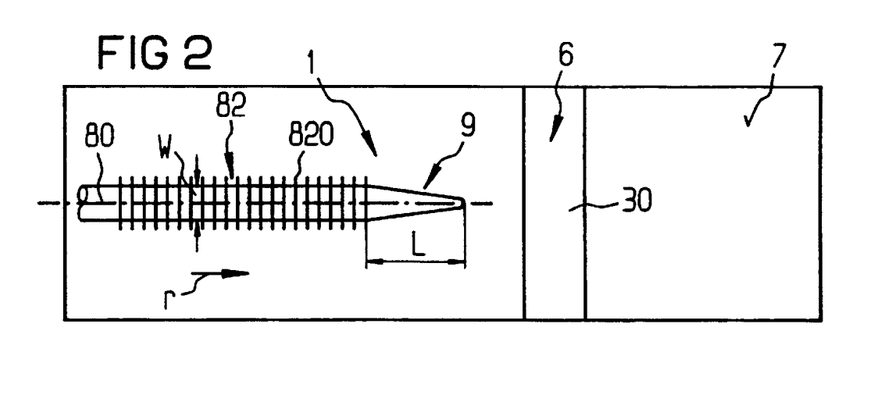
FIG. 2 is a plan view onto the first exemplary embodiment.
Figure 3:
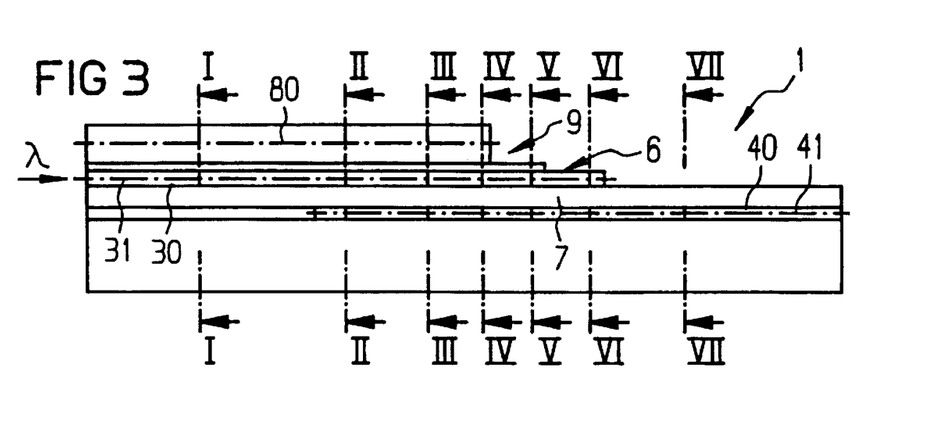
FIG. 3 a longitudinal section through the first exemplary embodiment along the axis of the wave propagation.
Figure 4A:
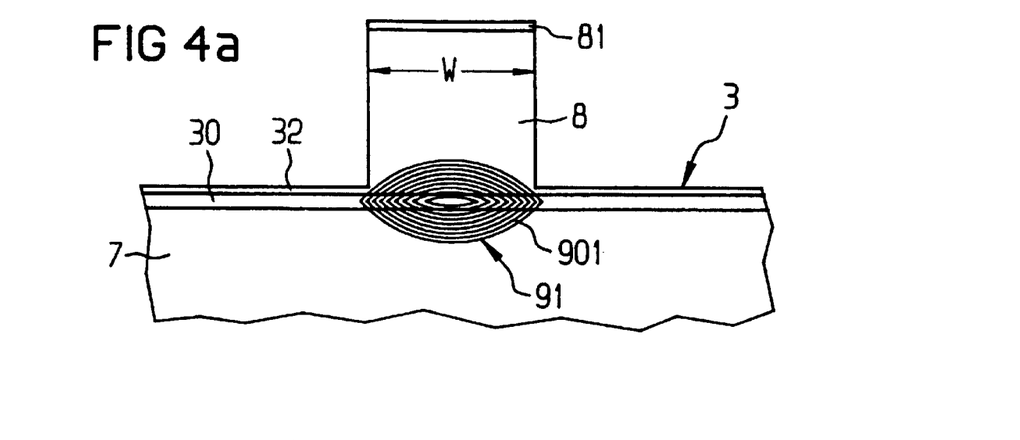
FIGS. 4a–4f are cross-sections through the exemplary embodiment according to FIGS. 1 through 3 along the section lines I—I through V—V and VII—VII in FIG. 2.
Figure 4B:
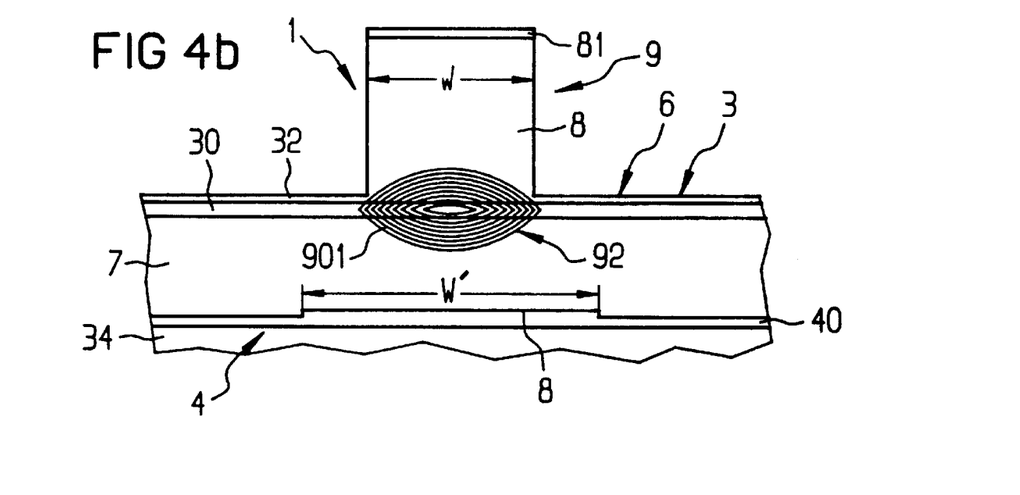
Figure 4C:
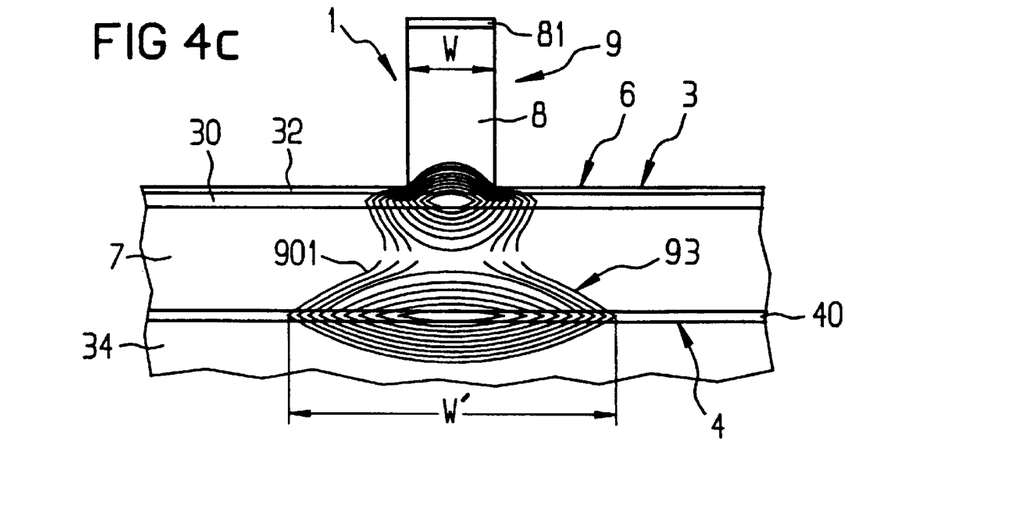
Figure 4D:
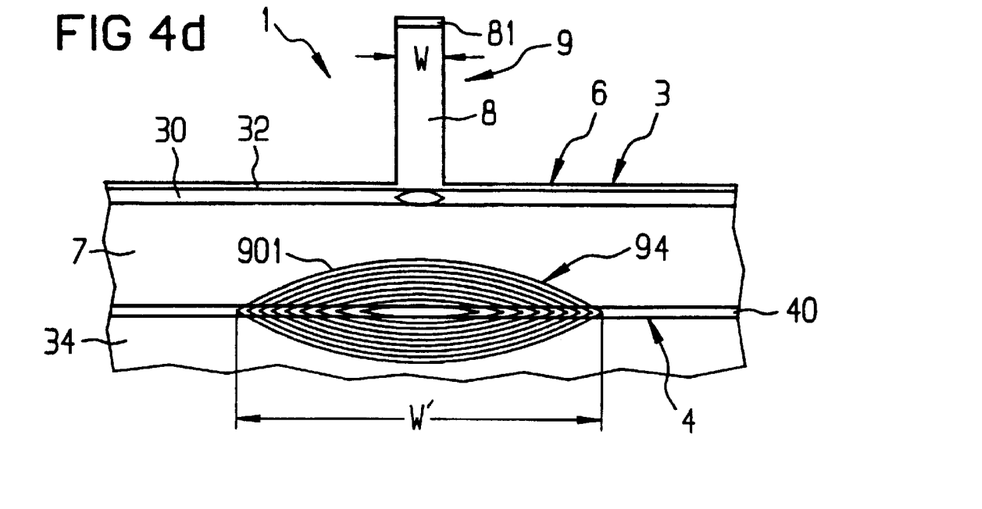
Figure 4E:
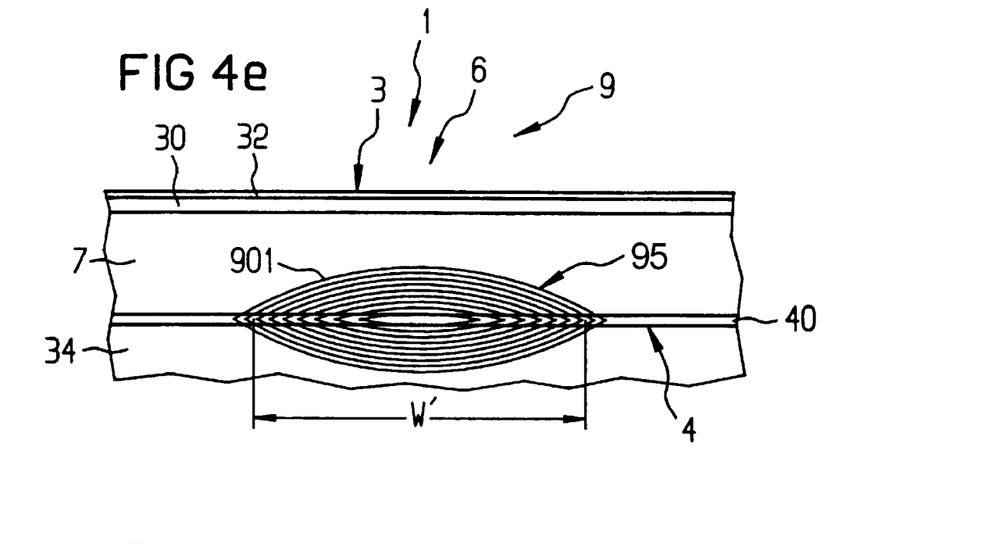
Figure 4F:
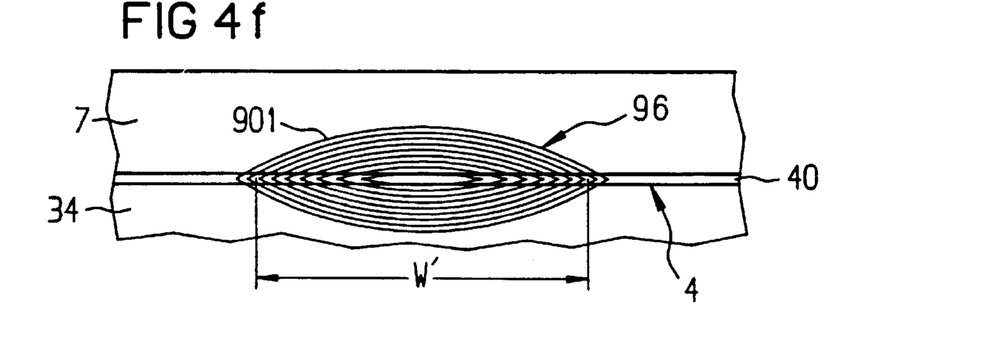

In the first exemplary embodiment according to FIGS. 1 through 3, the section line III—III of the cross-section through the overlap region 6 shown in FIG. 1, said section line III—III being perpendicular to the axis 31 or, respectively, 41 of the wave propagation, lies in the region where the optical wave or the optical field is guided in the waveguide 3 and waveguide 4.

According to FIG. 1, waveguide 3 is composed of the cladding layers 32 and 7 and of the core layer 30 arranged between these cladding layers 32 and 7 and is fashioned as ridge waveguide. Its ridge 8 is arranged at that flat side 301 of the core layer 30 facing away from the surface 20 of the substrate 2 and projects upward from the cladding layer 32 covering the core layer 30 at this flat side 301 which, like the cladding layer 7, exhibits a lower refractive index relative to this core layer 30.

The waveguide 4 is composed of the cladding layer 7 and 42 and of the core layer 40 arranged between these cladding layers 7 and 42, i.e. shares the cladding layer 7 with the waveguide 3, and is fashioned as buried ridge waveguide. Its ridge 8' is fashioned at the flat side 401 of the core layer 40 facing away from the surface 20 of the substrate 2 and as part of this core layer 40, and projects upwardly into the cladding layer 7. The cladding layer 42, which exhibits a lower refractive index relative to this core layer 40 like the cladding layer 7 separating the core layers 30 and 40 from one another is applied, for example, on the surface 20 of the substrate 2.

In this example, the core layer 30 of the waveguide 3 contains at least one mixed crystal of InGaAsP, whereby the average refractive index of the core layer 30 given a wavelength $\lambda$ of 1.55 $\mu$m is equal to 3.46, and the core layer 3 comprises, for example, a thickness d3 of 0.175 $\mu$m.

The core layer 40 of the waveguide 4 comprises a thickness d4 of 0.1 $\mu$m outside the ridge 8' and of 0.125 $\mu$m in the region of the ridge 8, contains a mixed crystal of InGaAsP with a band edge wavelength of 1.46 $\mu$m, and exhibits an average optical refractive index at the wavelength $\lambda$ of 1.55 $\mu$m of 3.46. The ridge 8' of the waveguide 4 has a width W'=$\lambda$.4 $\mu$m.

The cladding layer 32 of the waveguide 3 is composed of p-doped InP having a thickness d32 of 75 nm outside the ridge 8 of this waveguide 3 and of 2 $\mu$m in the region of this ridge, which is part of this cladding layer 32. The cladding layer 7 shared in common by the two waveguides 3 and 4 is composed of n-doped InP and comprises a thickness d34 of 1.3 $\mu$m, and the cladding layer 42 of the waveguide 4 is composed of n-doped InP.

The ridge 8 of the waveguide 3 comprises a cover layer 81 of the p-doped, ternary mixed crystal InGaAs and is not required for the function of the coupling means; rather, it is intended to enable as needed, for example, the injection of optical carriers for laser operation. In this case, the core layer 30 of the waveguide 3 can contain a multi-quantum well layer (MQW layer).

The exemplary coupling device 1 of FIG. 1 is designed for an operating wavelength of 1.55 $\mu$m. Since the waveguide 3 is a ridge waveguide, it can be fashioned like a MCRW laser diode, i.e. can comprise a double heterostructure with p-doped or, respectively, n-doped cladding layers, a tensed MQW layer as core layer 30, a distributed feedback grid (DFB grid) 82 indicated by grid lines 820 in FIG. 2, and can be provided with dielectric cover layers and contacts for current injection. Due to the insertion of the other core layer 4, however, a further waveguide 4 is integrated in addition to the MCRW laser diode. Due to the narrowing of the width W of the ridge 8 of the waveguide 3 from approximately 2 $\mu$m, as in the MCRW laser diode, to approximately 1 $\mu$m, light is coupled out in vertical direction, downward here. The DFB grating 82 is not required for the function of the arrangement 1 but is intended to enable as needed the frequency selection in, for example, a laser diode.

The section lines I—I through VII—VII in FIG. 3 identify various regions, whereby essentially only the regions lying between the section lines II—II, III—III and IV—IV are required for the cross-over from the waveguide 3 into the waveguide 4.

The region between the section lines I—I and II—II is the undisturbed ridge waveguide 3, i.e. no further waveguide is present under the waveguide 3 in this region. The regions between the section lines V—V, VI—VI and VII—VII lie at the end of the coupling device when the ridge 8 of the waveguide 3 is removed, when the core layer 40 is uncovered or, respectively, when only the lower buried ridge waveguide 4 is present. The regions between the section lines V—V, VI—VI and VII—VII therefore describe the transition from the disturbed to the undisturbed ridge waveguide 4 that lies in the region to the right of the section line VII—VII. The undisturbed ridge waveguide 4 is a ridge waveguide without a waveguide lying thereover.

The cross-sections through the exemplary embodiment according to FIGS. 1 through 3 that are shown in FIGS. 4a through 4f and are respectively taken along the section lines I—I through V—V and VII—VII show optical intensity distributions 91 through 96 in these cross-sections, whereby only one cross-section through the section line VI—VI in FIG. 3 is not shown.

It is assumed in FIGS. 4a through 4f that the width W of the ridge 8 of the ridge waveguide 3 is equal to W=2.25 $\mu$m in the regions between the section lines I—I and III—III, is equal to W=1.25 $\mu$m in the region between the section lines III—III and IV—IV, and is equal to W=0.75 $\mu$m in the region between the section lines IV—IV and V—V. The lines 901 of constant intensity are shown in steps of 1 dB for the optical fundamental mode of the coupling device 1.

It can be seen that the optical field is transferred in the direction r from the waveguide 3 into the waveguide 4.

Let the most important structural features be explained with reference to FIGS. 4a through 4f, namely that the undisturbed waveguide 4—in the region between I—I and II—II—and the undisturbed waveguide 4—in the region to the right of VII—VII—must exhibit a certain difference of the optical, effective refractive indices, i.e. an asymmetrical optical coupler must be present in the coupling zone in the region between III—III and IV—IV in the overlap region 6. In the region between I—I and II—II, the waveguide 4 has an effective optical refractive index $n_{eff}$=3.2. This was hardly changed at all by the insertion of the core layer 40 of the waveguide 4 in the overlap region 6. The waveguide 4 to the right of VII—VII has an effective optical refractive index $n_{eff}$=3.19. This is hardly changed at all due to the insertion of the core layer 30 of the upper waveguide 3 in the overlap region 6. When the width W of the ridge 8 of the upper waveguide 3 is reduced, then the effective refractive index of this waveguide 3 is reduced. When this effective index becomes approximately equal to or less then the effective refractive index of the lower waveguide 4, then the optical power is coupled over into the lower waveguide 4. When this reduction in the width W of the ridge 8 of the waveguide 3 ensues over an adequately long distance, then this power transfer is adiabatic, i.e. without emission losses in the ideal case. Given the described dimensioning of the coupling device 1, a distance L>125 $\mu$m is required in order to keep the emission losses low.

A coupling device 1 with suitability for a laser diode with ridge waveguide requires a difference between the effective refractive indices of the undisturbed waveguides 3, 4 of approximately 0.01 or greater. Adhering to specific values for the effective refractive index is a standard demand for the manufacture of DFB lasers since a band width of ±0.001 is required for the effective refractive index in order to keep the emission wavelength in the region of ±1.6 nm (spacing of two wavelength-division multiplex channels).

The structure and the design rules of the vertical coupler are now described in greater detail.

Structural versions and applications of the inventive coupling device 1 are now described.

Figure 5:
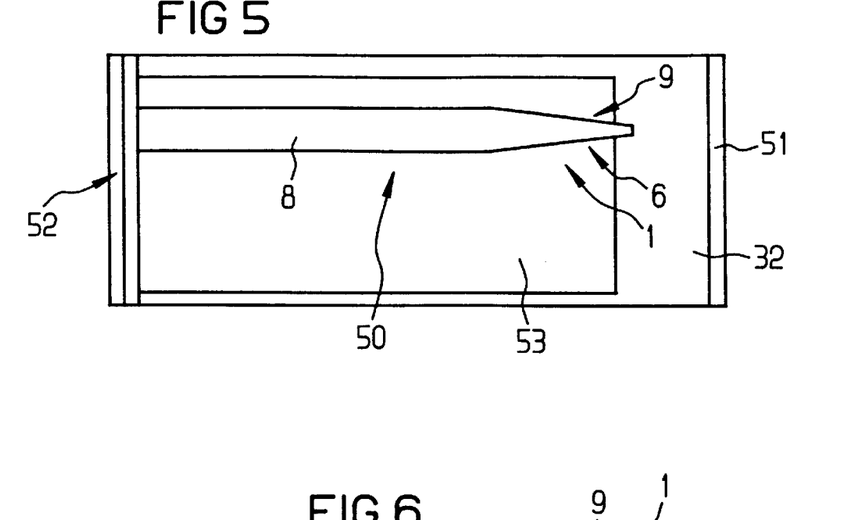
FIG. 5 is a plan view onto a high-power laser diode wherein an inventive arrangement is employed.
Figure 6:
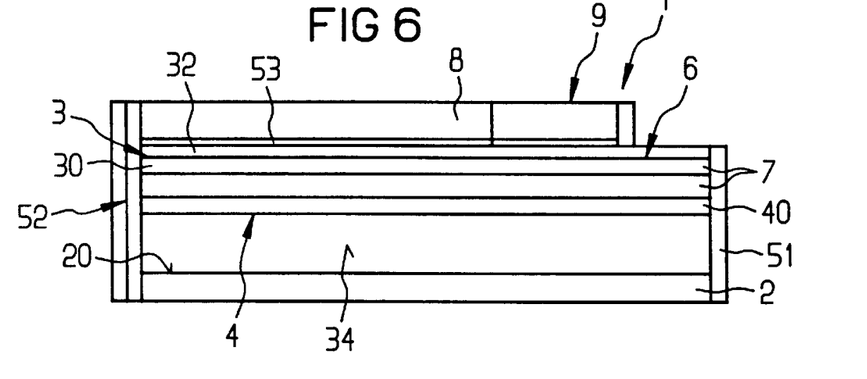
FIG. 6 is a longitudinal section through the laser diode of FIG. 5 along the axis of the wave propagation.

The high-power laser diode 50 shown in FIGS. 5 and 6 comprises an anti-blooming layer 51 and an inventive coupling device 1 at the light exit side and mirroring layers 52 at the backside and is fashioned on a substrate 2 of n-doped GaAs. The core layer 30 of the waveguide 3 is a laser-active MQW layer of AlGaAs/Ga/As that is surrounded by p-doped AlGaAs and n-doped AlGaAs of type 1 for forming the double hetero structure. A further n-doped layer of AlGaAs of type 2 is embedded into the lower n-doped layer of AlGaAs of type 1 as lower core layer 40, this exhibiting a lower aluminum content then the surrounding layer of AlGaAs. The surrounding layer AlGaAs forms the cladding layer 7 between the core layers 30 and 40 and the cladding layer 42 between the core layer 40 and the surface 20 of the substrate 2. The overlap region 6 of the core layers 30 and 40 extends over the entire length of the laser diode in the direction of the axis 31 or, respectively, 41 of the wave propagation. 53 references a terminal contact.

A window structure that forces the optical field into the lower waveguide 4 is inventively attached at the light exit side with the assistance of the inventive coupling device 1. The optical power density at the end of the optically intensifying, upper core layer 30 is thereby greatly reduced and an excessive heating due to absorption at the end of the upper core layer 30 is avoided. As adequately described in the literature, of course, dielectric insulation layers and contacts are also required for completing the high-performance layer, and mirroring layers at that side of the laser diode lying opposite the light exit side are meaningful.

Figure 7:
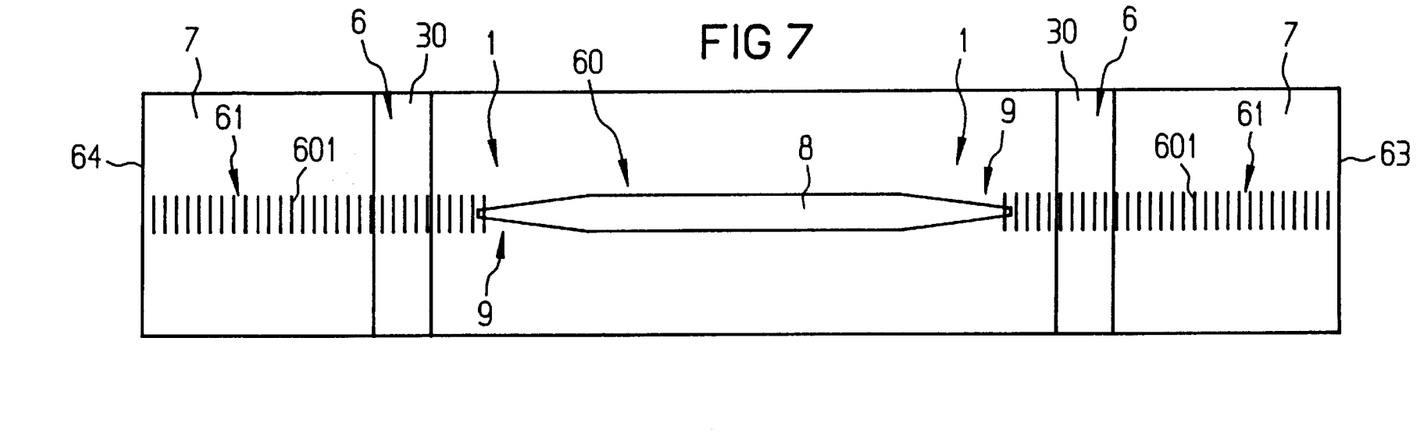
FIG. 7 is a plan view onto a DBR laser diode wherein an inventive arrangement is employed.
Figure 8:
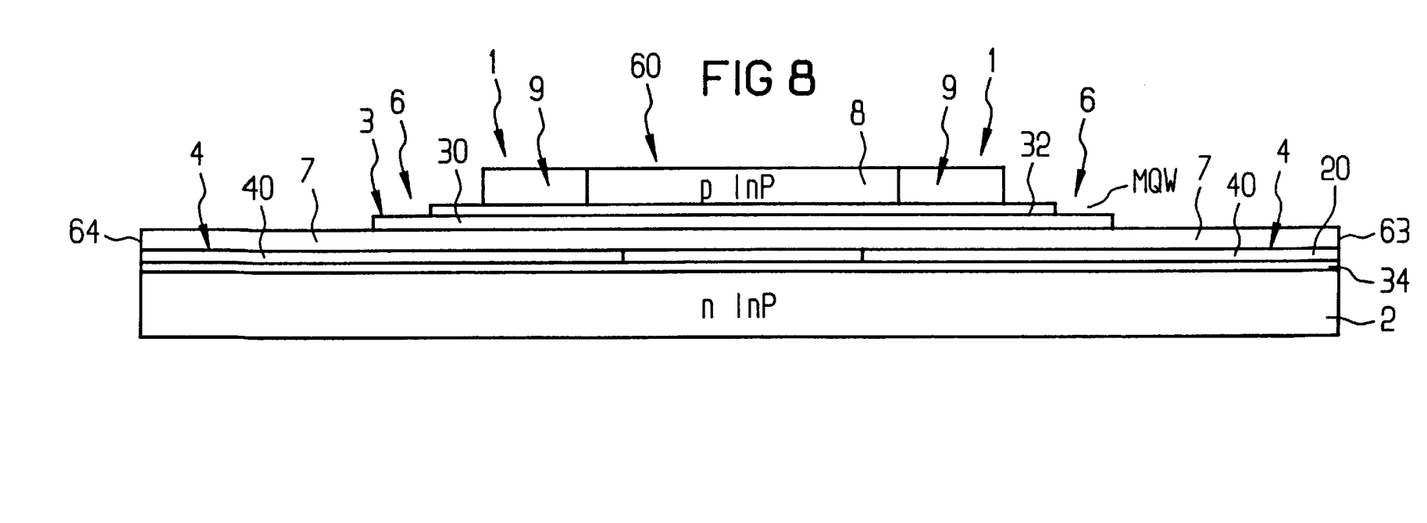
FIG. 8 is a longitudinal section through the DBR laser diode according to FIG. 7 along the axis of the wave propagation.

Given the distributed Bragg reflector laser diode (DBR laser diode) 60 shown in FIGS. 7 and 8, a respective inventive arrangement 1 is provided at both emission sides of the diode 60. The grid lines 601 symbolize a vertical grating 61, similar to FIG. 2. The two reflectors 63 and 64 are connected via the coupling devices 1 to the electrically pumped, laser-active core layer 30. The core layer 40 of the lower waveguide 4 is implemented as a thin layer, as in the example of FIGS. 1 through 3, in order to be able to utilize planar structuring techniques. This correlator 40 carries the Bragg grating 61.

The DBR diode 60 is fashioned on the surface 20 of a substrate 2 of n-doped InP; its core layer 40 is composed of InGaAsP; its core layer 30 is a MQW layer and its cladding layer 7 and cladding layer 32 with ridge 8 are composed of InP, whereby the cladding layer and ridge 8 are p-doped.

Figure 9:
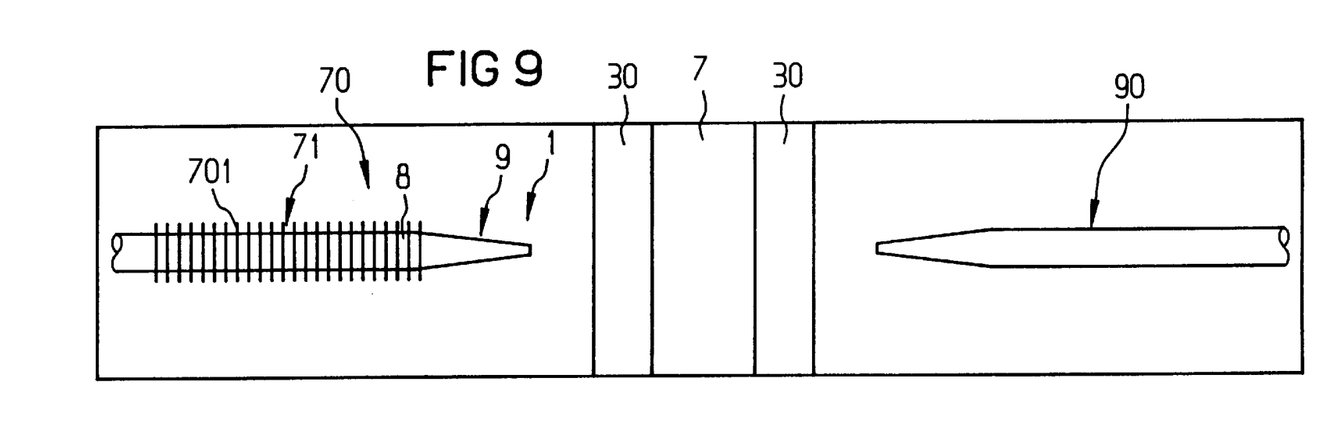
FIG. 9 is a plan view onto a DFB laser diode to which an optical modulator is coupled via inventive arrangements.
Figure 10:
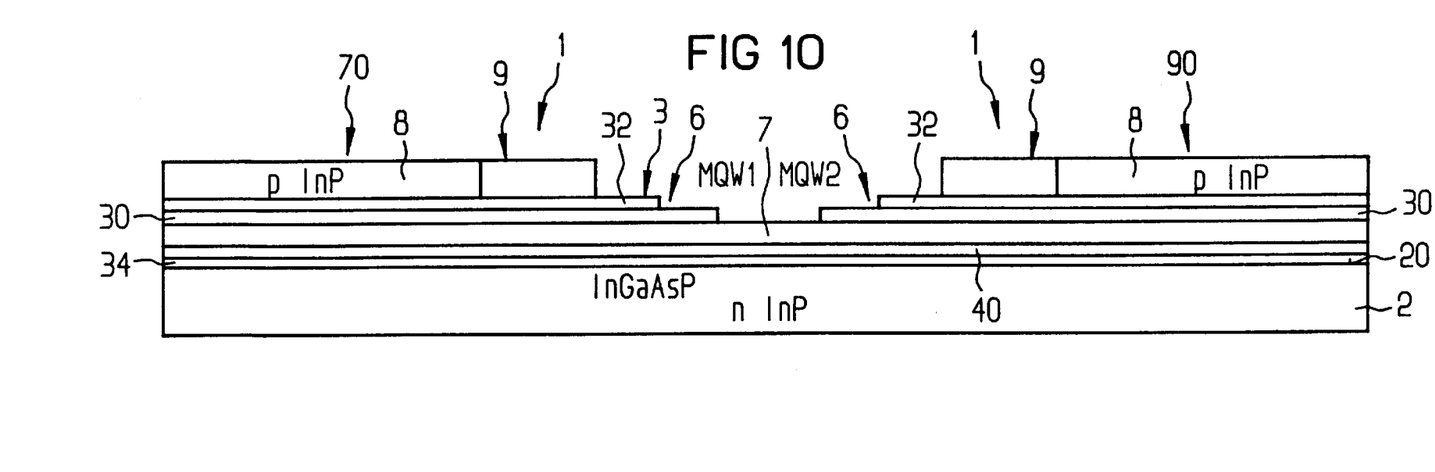
FIG. 10 is a longitudinal section through the DFB laser diode and the modulator of FIG. 9 along the axis of the wave propagation.

Given the successive connection of two optical components with a respective ridge waveguide 3, specifically a DFB laser diode and a modulator, shown in FIGS. 9 and 10, and given employment of the inventive arrangements 1, the diode is referenced 70 and the modulator is referenced 90. The grid lines 701 in the region of the ridge 8 of the ridge waveguide 3 of the diode 70 symbolize a DFB grating 71 similar to FIG. 2. The ridge waveguide 3 with ridge 8 of the modulator 90 is constructed similar to the ridge waveguide 3 of the diode 70 but contains a different core layer 30, for example a MQW layer for realizing an electro-absorption modulator. Whereas, given the diode 70, the optical wave guided in the waveguide 3 couples over downward into the waveguide 4, the optical wave supplied in the waveguide 4 given the modulator 30 is coupled upward into the waveguide 3.

The components 70 and 90 are arranged in a common n-doped InP substrate 2. The core layer 40 of the lower waveguide 4 is composed of InGaAsP and is implemented as a thin layer, as in FIG. 1, in order to be able to utilize planar structuring techniques. The core layers 30 are MQW layers. The cladding layer 7 and cladding layers 32 with ridge 8 are composed of p-doped InP. The core layers 30 and 40 and the p-doped parts are realized as electrically insulated islands. This form of electrical insulation is advantageously enabled by the employment of the inventive arrangements 1. For completing the modulator 90, dielectric insulating layers and contacts are also required, these being adequately described in the literature.

By employing inventive arrangements 1, more complicated optical circuits having a plurality of components can also be advantageously realized. The optical connections are arranged in a common plane lying under the components that can therefore be referred to as optical back plane by analogy to voice control in apparatus design.

Figure 11:
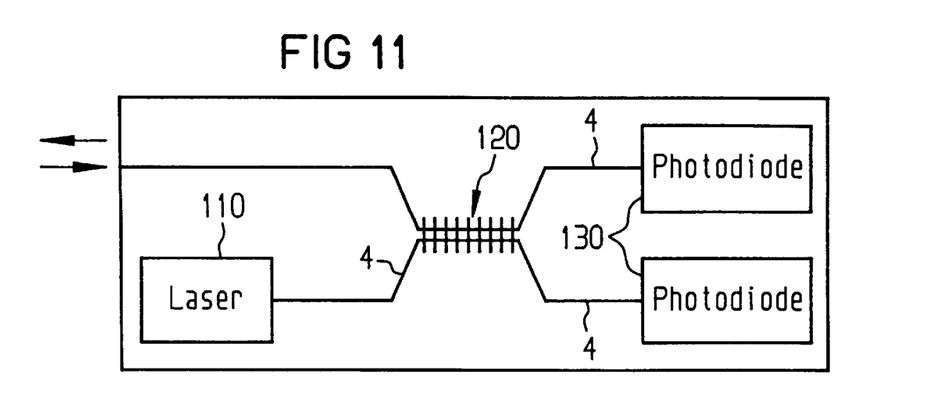
FIG. 11 is a plan view onto a bidirectional module with laser diode and photo diodes, whereby an inventive arrangement is employed.

The bidirectional module shown in FIG. 11 is composed of a laser diode 110 for, for example, 1.5 $\mu$m wavelength, of a grid coupler 120 for 1.5 $\mu$m wavelength and photo diodes 130. The grid coupler 120 is coupled to the laser diode 110 by an inventive arrangement (not shown in detail) and is arranged in the lower waveguide 4 of this arrangement. The photo diodes 130 are also coupled to the grid coupler 120 by inventive arrangements. The entering light has, for example, a wavelength of 1.3 $\mu$m; the light emitted by the diode 110 has a wavelength of 1.5 $\mu$m.

The module according to FIG. 11 is an optical circuit with optical back plane that also contains a planar coupler and curved waveguides. In FIG. 11, the optical back plane is not used for only the connection of components; rather, other components are also incorporated into the back plane.

Figure 12:
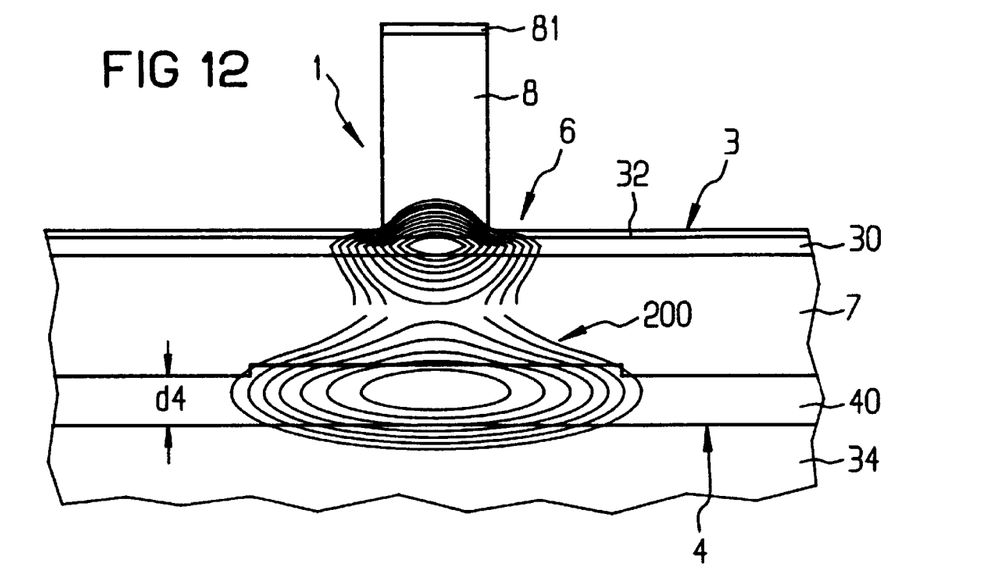
FIG. 12 is a cross-section through the overlap region of an exemplary embodiment of the inventive arrangement perpendicular to the axis of the wave propagation for polarization-independent function in the overlap region where an optical wave is guided in both waveguide cores.

The arrangement 1 shown in cross-section in FIG. 12 is designed for polarization-independent function in the overlap regions 6, in the region, to be exact, where the optical field in the upper waveguide 3 and lower waveguide 4 is guided. The upper waveguide 3 is a ridge waveguide as in FIG. 1. The lower waveguide 4 is a buried ridge waveguide wherein, by contrast to FIG. 1, the core layer 40 of the lower waveguide 4 is implemented thicker and with a mixed crystal of InGaAsP with a lower refractive index. The thickness d4 of the core layer 40 amounts, for example, to d4=0.6 $\mu$m in the region of the ridge 8 and 0.5 $\mu$m outside this region. The band edge wavelength of the mixed crystal of InGaAsP amounts, for example, to 1.05 $\mu$m. The cladding layer 7 of n-doped InP shared in common by the two waveguides 3 and 4 is somewhat thinner then in FIG. 1 and comprises, for example, a thickness d34 of 1.1 $\mu$m. The intensity distribution is likewise shown and referenced 200.

In the arrangement 1 of FIG. 12, the lower waveguide 4 is a polarization-independent waveguide. Since its correlator 40 is thicker and its refractive index lower, the waveguide properties of index and absorption are less dependent on the polarization of the optical field given the same filling factor. Filters, power splitters, etc., can then be realized in the lower waveguide plane. When the optical field in the lower waveguide 4 has a larger field diameter in vertical direction or when the −3 dB line of constant intensity is less elliptical then in the upper waveguide, i.e. more circular, then the coupling by cross-over into the lower waveguide 4 is improved at an optical fiber, i.e. a mode transformer or taper is realized. When contacts are realized on the lower waveguide 4, then, for example, a phase modulator for a Mach-Zehnder interferometer can be realized thereat.

Figure 13:
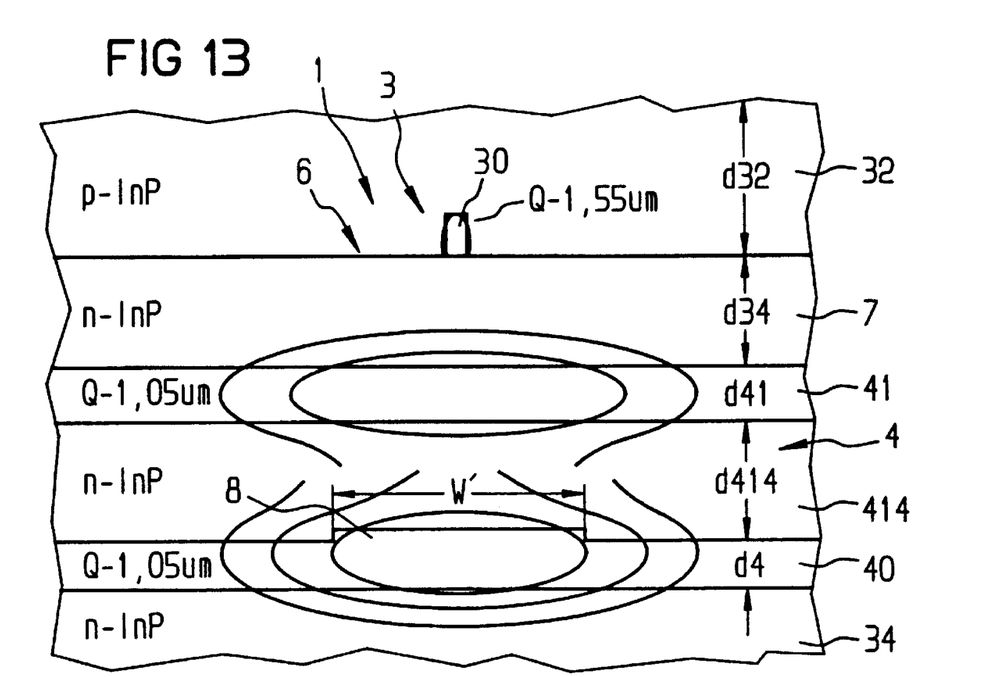
FIG. 13 is a cross-section through the overlap region of an exemplary embodiment of the inventive arrangement perpendicular to the axis of the wave propagation wherein a waveguide comprises a core layer and the other waveguide comprises two core layers.

Given the arrangement 1 shown in cross-section in FIG. 13, the cross-section is taken in the region where the optical field is guided in the upper waveguide 3 and lower waveguide 4. The upper waveguide 3 is a buried heterostructure waveguide (BH waveguide); the lower waveguide 4 contains two core layers 40 and 41, whereof one, for example the core layer 40, comprises a ridge 8', so that the waveguide 4 is a buried ridge waveguide. The width W' of the ridge 8' of the core layer 40 amounts, for example, to W'=2.6 $\mu$m. The core layer 30 of the upper waveguide 3 contains a mixed crystal of InGaAsP. The thickness d3 of this core layer 30 amounts, for example, to 0.4 $\mu$m; the average refractive index of this core layer 3 given a 1.55 $\mu$m waveguide amounts, for example, to 3.52. The core layers 40 and 41 of the lower waveguide 4 contain a mixed crystal of InGaAsP. The thickness d41 of the core layer 41 amounts, for example, to 0.55 $\mu$m; the thickness d4 of the core layer 40 in the region of the ridge 8 amounts, for example, to 0.6 $\mu$m and, for example, to 0.5 $\mu$m outside the ridge 8. The mixed crystal of InGaAsP exhibits, for example, a band edge wavelength of 1.05 $\mu$m. The average optical refractive index of the core layers 41 and 40 at a wavelength of 1.55 $\mu$m is equal to 3.25. The upper. cladding layer 32 is composed of p-doped InP and comprises a thickness d32 of, for example, 2 $\mu$m; the cladding layer 7 shared in common by the two waveguides 3 and 4 and the cladding layer 414 between the core layers 41 and 40 of the lower waveguide 4 are composed of n-doped InP. The thickness d414 of the cladding layer 414 is, for example, equal to 1.1 $\mu$m, like the thickness d34 of the cladding layer 7, and cladding layers lying under the core layer 40 are likewise composed of n-doped InP.

The arrangement 1 of FIG. 13 is designed for an operating wavelength of 1.5 $\mu$m. Since the upper waveguide is BH waveguide, it can be fashioned like a BH laser diode, i.e. can comprise a double heterostructure with p-doped or, respectively, n-doped cladding layers 32 and 7, and InGaAsP layer as core layer of the band edge wavelength 1.5 $\mu$m, and can be provided with dielectric cover layers and contacts for current infection. In addition to the BH laser diode, however, a lower waveguide 4 is integrated by the insertion of two further core layers 41 and 40. Due to the narrowing of the width of b of the correlator 3 of the upper waveguide 3 from approximately 1 $\mu$m to approximately <0.3 $\mu$m, light is coupled out downward in the direction to the waveguide 4.

Figure 14:
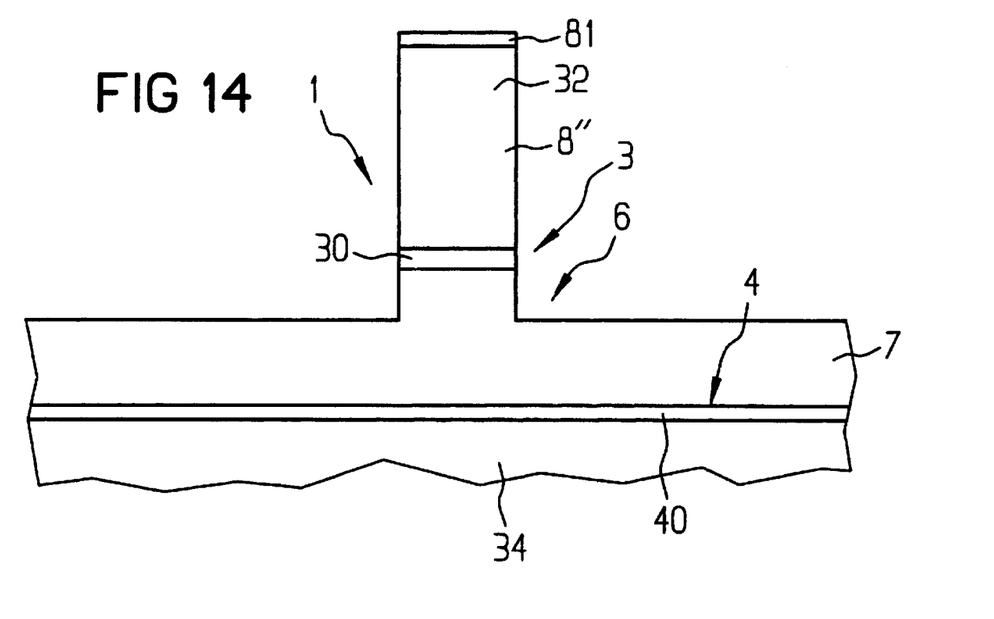
FIG. 14 is a cross-section through the overlap region of an exemplary embodiment of the inventive arrangement similar to the first exemplary embodiment perpendicular to the axis of the wave propagation, whereby the other waveguide is fashioned in the ridge of the ridge waveguide.

The exemplary embodiment according to FIG. 14 differs from the example according to FIGS. 1 through 3 only essentially in that the waveguide 4 is a ridge waveguide with a ridge 8" that projects from the cladding layer 7, and in that the waveguide 3 with its core layer 3 is fashioned in the ridge 8" of the waveguide 4.

The exemplary embodiment according to FIGS. 9 and 10 and the exemplary embodiment according to FIG. 11 can be respectively interpreted as an arrangement for coupling at least two optical components to one another, a semiconductor laser 70 and an optical modulator 90 in the first-cited example, a semiconductor laser 110 and two optical detectors 130 in the second-cited example, whereby each component 70, 90, 110, 130 comprises a respective core layer 30 belonging to an optical waveguide 3 for guiding an optical wave having a specific wavelength $\lambda$, whereby this arrangement, however, need not comprise the limitation of the minimum thickness of the cladding layer 7 and of phase matching, even though these limitations can definitely be realized and can definitely be advantageous in this arrangement.

Figure 15:
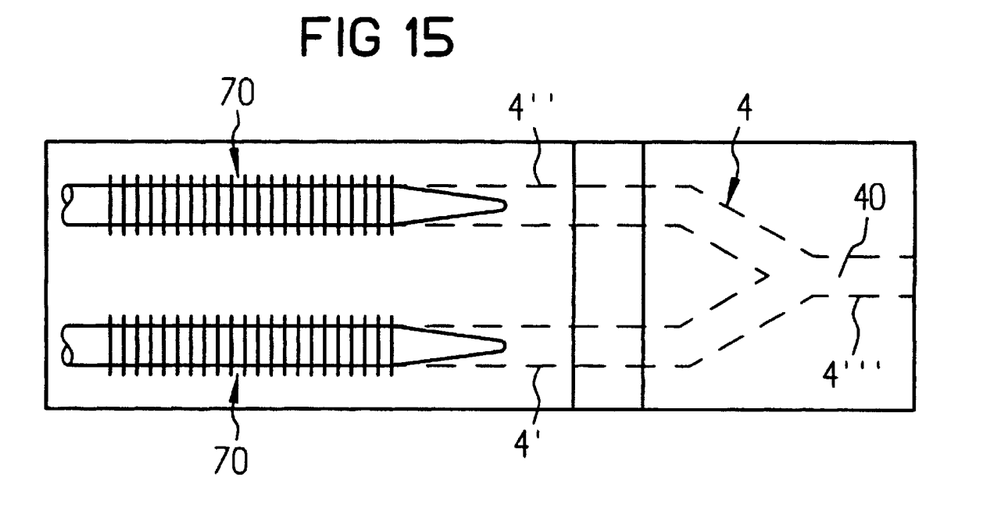
FIG. 15 is an arrangement similar to the arrangement according to FIGS. 1 through 3 and shown in the same way as in FIG. 2, whereby an optical waveguide forms a waveguide fork having at least two waveguide branches, whereby a respective component is arranged in each waveguide branch.

Given the exemplary embodiment of an arrangement according to FIG. 12 shown is FIG. 15 the optical, waveguide 4 comprising the further core layer 40 forms a waveguide 4 with at least two waveguide branches 4' and 4". Similar to the example of FIGS. 1 through 3 or FIGS. 9 and 10, a core layer 30 of a respective component and the further core layer 40 overlap one another in every waveguide branch 4', 4" in an overlap region 6.

For example, each component is composed of a semiconductor laser, for example the laser 70 according to FIGS. 9 and 10, which can also form an optical amplifier. In this case, the waveguide fork 4 acts as optical uniter that accepts the light generated by each of the two components 70 or 110 in the appertaining waveguide branch 4' or 4" and supplies it to a stem waveguide 4'" of the fork.

The two semiconductor lasers 70 can be fashioned such that they emit at wavelengths different from one another. This can be achieved by a slight difference of the spacing of the grid lines 701 of a distributed feedback grating 71 of the two semiconductor lasers 70. As a result thereof, for example, the emission wavelengths of the two semiconductor lasers 70 can differ from one another in the 1.55$\mu$ wavelength band by, for example, 60 GHz.

The arrangement according to FIG. 15 can be advantageously employed as module for optical millimeter wave generation, as required for future mobile communication systems (see, for example, an article by R. P. Braun et al, "Optical Millimeter-Wave Generation and Data Transmission for Mobile 60–70 GHz-Band Communications" $22^{nd}$ Europ. Conference on Optical Communication (ECOC) '96, Oslo, Paper ThC 1.3, pp. 4.634–66), whereby one semiconductor laser 70 functions as signal laser and the other functions as reference laser. The inventive arrangement greatly simplifies the integration of the two semiconductor lasers 70 or of other components. Since the optical field is more greatly expanded in the waveguide 4 containing the core layer 40 (see FIG. 4), the coupling of the arrangement to optical fiber waveguide is advantageously facilitated.

What is claimed is:

1. An arrangement for coupling at least two optical waveguides to one another, each of said waveguides having one core layer for guiding an optical wave having a specific wavelength $\lambda$, said arrangement comprising the core layers of both waveguides being arranged essentially parallel to one another at a vertical distance from one another that is at least equal to half the wavelength $\lambda$ of the wave guided in the core layer, said core layers overlapping one another in an overlap region and being separated from one another in the overlap region by a cladding layer having a refractive index that is lower relative to the refractive index of the core layers, at least one of the waveguides having a ridge being fashioned on a flat surface of the core layer and having an end face in the overlap region, the longitudinal axis of said ridge determining a direction of an axis propagation of the optical waves guided in said core layer proceeding along a direction parallel to said core layer and the ridge having a cross-sectional constriction in the overlap region in a specific direction of the longitudinal axis of the ridge, said constriction of the ridge having a uniform thickness along the longitudinal axis and a width that tapers in the specific direction toward the end face, and the core layer of the waveguide with the ridge and core layer of the other waveguide each having a uniform thickness along the longitudinal axis of the ridge so that an optical wave guided in the core layer of a waveguide can be coupled over through the cladding layer into the core layer of the other waveguide in the overlap region.

2. An arrangement according to claim 1, wherein the ridge of the ridge waveguide comprises a cross-sectional taper in the specific direction in the overlap region and ends in the overlap region.

3. An arrangement according to claim 1, wherein both waveguides are fashioned as ridge waveguides.

4. An arrangement according to claim 1, wherein at least one of the waveguides comprises a semiconductor laser.

5. An arrangement according to claim 1, wherein at least one of the waveguides comprises an optical modulator.

6. An arrangement according to claim 1, wherein at least one of the waveguides comprises a mode transformer.

7. An arrangement according to claim 1, wherein at least one of the waveguides comprises a Bragg grating.

8. An arrangement according to claim 1, wherein at least one of the waveguides comprises a curved course.

9. An arrangement according to claim 1, wherein at least one of the waveguides comprises an optical filter.

10. An arrangement according to claim 1, wherein at least one of the waveguides comprises an optical power splitter.

11. An arrangement for coupling at least two optical components to one another, each component comprising a respective core layer belonging to an optical waveguide for guiding an optical wave having a specific wavelength $\lambda$, said arrangement comprising core layers of the components being arranged essentially parallel to one another, an additional core layer of an optical waveguide being arranged at a vertical distance from the core layers of the components, said core layer of each component and the additional core layer overlapping one another in a respective overlap region and being separated from one another in the overlap region by a cladding layer having a refractive index that is lower relative to the core layers and through which the optical wave coupled over between the core layers arranged at a vertical distance from one another in the overlap region, at least one waveguide being a ridge waveguide having a ridge fashioned in at least one flat side of the core layer of the waveguide and having an end face in the overlap region, said ridge proceeding along a longitudinal axis that is parallel to said core layer and determines the direction of the axis of propagation of an optical wave guided in the core layer of the waveguide, said ridge having a cross-sectional constriction in a specific direction of the longitudinal axis of the ridge in the overlap region, said constriction of the ridge having a uniform thickness along the longitudinal axis and a width that tapers in the specific direction toward the end face and the core layers of the component and the additional core layer having a uniform thickness.

12. An arrangement according to claim 11, wherein the optical waveguide having the additional core layer forms a waveguide fork having at least two waveguide branches and the core layers of the respective components and the additional core layer in each waveguide branch overlapping one another in an overlap region.

13. An arrangement according to claim 11, wherein a component is composed of a semiconductor layer.

14. An arrangement according to claim 11, wherein one of the components is composed of an optical detector.

15. An arrangement according to claim 11, wherein at least one of the components is composed of an optical modulator.

16. An arrangement according to claim 11, wherein at least one of the components is composed of an optical amplifier.

17. An arrangement according to claim 11, wherein at least one of the core layers is a core layer of a monomode waveguide.

* * * * *